(12) United States Patent
Anderson et al.

(10) Patent No.: US 12,442,810 B2
(45) Date of Patent: Oct. 14, 2025

(54) MOISTURE SENSOR SYSTEMS AND METHODS OF INSTALLATION

(71) Applicant: ACCLIMA, INC., Meridian, ID (US)

(72) Inventors: Scott Knudson Anderson, Meridian, ID (US); Andrew Relyea Horton, Nampa, ID (US); David James Anderson, Meridian, ID (US); Bradley Ray Larson, Meridian, ID (US)

(73) Assignee: ACCLIMA, INC., Meridian, ID (US)

( * ) Notice: Subject to any disclaimer, the term of this patent is extended or adjusted under 35 U.S.C. 154(b) by 320 days.

(21) Appl. No.: 18/331,794

(22) Filed: Jun. 8, 2023

(65) Prior Publication Data

US 2023/0400447 A1 Dec. 14, 2023

Related U.S. Application Data

(60) Provisional application No. 63/366,143, filed on Jun. 9, 2022.

(51) Int. Cl.
*G01N 33/24* (2006.01)
*G01D 5/353* (2006.01)

(52) U.S. Cl.
CPC ......... *G01N 33/246* (2013.01); *G01D 5/3539* (2013.01)

(58) Field of Classification Search
CPC ............................ G01N 33/246; G01D 5/3539
See application file for complete search history.

(56) References Cited

U.S. PATENT DOCUMENTS

2018/0136358 A1* 5/2018 Farrington ............... G01V 3/30

\* cited by examiner

*Primary Examiner* — Hwa Andrew Lee
(74) *Attorney, Agent, or Firm* — Summit Patents PC (57) ABSTRACT

An waveguide on access tube (WOAT) system measures soil moisture by sensors placed at various depths of a medium, such as soil. The WOAT system includes a rigid tube into which an inflatable tube with various sensors bonded to it is inserted. Once in place, the rigid tube is removed and the inflatable tube and its sensor are inflated to the diameter of the hole or channel in which it is positioned. The ability to inflate the inflatable tube allows for the sensors on the inflatable tube to be force fit against the interior wall of the hole or channel for proper soil or ambient environment measurements.

20 Claims, 9 Drawing Sheets

MOISTURE SENSOR SYSTEMS AND METHODS OF INSTALLATION

CROSS-REFERENCE TO RELATED APPLICATIONS

This application claims priority to and the benefit from the U.S. Provisional Patent Application 63/366,143, filed Jun. 9, 2022, and titled, "TDR SENSOR SYSTEM AND METHOD OF INSTALLATION," which are incorporated herein by reference in their entirety for all purposes.

BACKGROUND

Sensors that measure water content at multiple levels below the surface have been around for many years but their effectiveness, credibility and ease of installation have been problems of serious magnitudes. Some of the conventional sensors arm a 2 meter long, thin-walled access tube with an active core consisting of multiple inductance/capacitance (LC) oscillators mounted on an inner shaft. The capacitive element in these oscillators is two broad, flat rings—vertically adjacent to each other—and that are in close proximity to the inner wall of the tube. The electric field lines from such a capacitor pass through the wall of the tube and into the soil where the soil permittivity enhances the electric field and causes the capacitance between the two rings to increase. Permittivity in soils is a strong function of water content. The ring capacitors are resonated with inductors at each measurement level. The frequency of oscillation is a function of inductance and capacitance (water content) and is then interpreted to provide the approximate soil water content at that level.

Many problems exist with the conventional sensors. Installing the access tube is difficult in harder soils, which requires auguring out the core and forcing the tube downward with a press. If the augured hole is oversized for the access tube, then the air gap between the soil and tube causes severe under-estimation in the capacitance measurement—and hence in the water content measurement. The air gap also fills with water during irrigation or rainfall thus causing a gross over-estimation of the capacitance. Capacitive sensors all have a fatal flaw in that salts or fertilizer in the soil attenuate the electric field, and thus cause large errors in the measured capacitance and water content. Because of this flaw, these types of sensors are used only in a relative mode and are not credible for absolute water content readings.

More recently, new techniques have been used that have a long multiple level sensor with sensing elements arranged vertically in a tapered access tube. A special tapered auger is used to drill a tapered hole in the soil. The sensor is then dropped into the hole to the point where the tapered tube diameter and the tapered hole diameter coincide and form a tight bond between them. This long conical-shaped tube reduces the air-gap problem between the tube and sensor body. However, it still suffers the problems of sensitivity to salts and is also difficult to install in drier coarse-textured soils because the hole caves in when the auger is removed.

Another recent development in soil sensors overcomes the inaccuracy problem associated with saline soils by using a different measurement technology than is used by the capacitance sensors. This sensor uses a Time Domain Reflectometer (TDR), which measures the speed of electromagnetic propagation through the soil. That speed is independent of soil composition and chemistry and is governed only by the permittivity (electrical property) and permeability (magnetic property) of the medium in which the EM field propagates. Hence the water content readings are highly accurate and are not affected by salinity and fertilizer at nominal levels in which crops grow. This type of soil sensor uses multiple TDR waveguides wrapped around an access tube in a spiral fashion with a 2.5 inch diameter screw. An undersized hole is augured into the soil and the sensor is screwed into the hole. The TDR sensor waveguide rods act as threads on a screw to pull the sensor into the ground as the assembly is rotated with a large wrench. When fully inserted the fit between the sensor and hole is very tight.

However, even though this TDR sensor is accurate and stable, it comes in lengths only down to 1 meter depth and is difficult to manufacture. The waveguides are nominally separated at 10 cm intervals and their effective measurement depth is only about a 1 inch spiral band between the waveguide electrodes. Hence, there is no continuous vertical measurement across each vertical zone. The upper zone resides in the screw locus left by the insertion process. Irrigation or rainwater can run down this locus and wet the waveguide in the upper zone.

Yet another recent development in soil sensors uses a screw-in sensor in which the screw threads are exaggerated into flutes that protrude widely from the sensor shaft. The sensor elements are embedded in these screw flutes near the outer edge. Only two elements are offered for two measurement depths. The locus left by the insertion of the screw flutes opens up cavities in the soil where rainwater and irrigation water can enter thus affecting the accuracy of the measurement.

Thus, the industry can benefit from new sensors that measure soil moisture to obtain credible water content readings using a probe that is accurate, continuous, tightly installed, and easy to insert into the ground.

BRIEF DESCRIPTION OF THE DRAWINGS

Non-limiting and non-exhaustive embodiments of the invention are described with reference to the following drawings. In the drawings, like reference numerals refer to like parts throughout the various figures, unless otherwise specified, wherein.

DETAILED DESCRIPTION

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced.

Soil water profiles are important to accurately measure in various applications, including flood and drought prediction, food crop irrigation control, and plant development feedback. Specifically, in flood and drought prediction, the distribution of water in soil below the surface is generally not uniform. In order to know the total amount of water in a watershed—and thus to accurately predict flood and drought conditions—it is necessary to take measurements at several depths and add up the water content at each depth to arrive at the total amount. If the water holding capacity (field capacity) of the soil is known then it is possible to determine how much additional water the soil can hold before runoff occurs. If snow depth is also known then it is possible to predict how much of the snowmelt will be held in the watershed during the spring snowmelt and how much will run off in the streams. Where the soil is nearly saturated throughout its full depth and excessive snowpack exists flooding will occur during the snowmelt season. Conversely, where the soil is dry the water from the snowmelt will be absorbed into the soil and the stream flow will be diminished—possibly leading to empty reservoirs downstream. The key to these predictions lies in the assessment of the total soil water content of the soil throughout the watershed.

In food crop irrigation control, soil moisture sensors can be deployed on farms to provide water content information for determining the proper time and amount to apply irrigation water. A single measurement at one depth is generally not representative of the total information required to make correct inferences regarding the stresses imposed on the plants due to insufficient or excessive water. Some plants, such as grasses, transpire water near the surface and will show stress even when there is significant water 20 cm below the surface. Other plants transpire water at deeper levels and are relatively tolerant to drying at the surface. Multi-level sensors are recommended to provide more accurate information regarding the distribution of water throughout the root zone.

Still further, in plant development feedback, genetically modified organism (GMO) researchers are seeking to develop food crops that can yield well in the arid agricultural areas of the world. Arid soils often have sufficient water for food production at depths beyond the rooting depth of the crop. The basic GMO approach is then to modify the plant to take up water at increased depths. Test crops of modified cultivars are planted and soil moisture profilometers are installed adjacent to the test plants. From the obtained readings the transpiration of the plants at various depths can be measured. The successful GMO modifications can be identified and further developed.

The WOAT is a multi-element Time Domain Reflectometry (TDR) System that measures soil water content in layers of a range of thickness through layered permittivity and volumetric water content measurements. In an example, the WOATs shown in FIGS. 1-2A, the WOAT measures soil water content in 10 cm thick layers. The basic structure of the WOAT is an inflatable, flexible 2" diameter tube with 10 cm long flexible plastic plates bonded to its surface. Each plate is a thin semi-circular TDR system. A complete ultra-high performance TDR is embedded in the plastic wall of each plate. The disclosed WOATs offer TDR on a single thin piece of silicon measuring only 2 mm square. The disclosed WOAT system can be flexibly configured to measure in layers down to a depth of up to 2 meters (20-10 cm layers). It can also be configured to provide two or more independent 'replication' measurements at each layer for greater confidence in the reported water content at each layer. A fully populated WOAT then has 40 TDR elements in the example shown in FIGS. 1-2B. It should be apparent to the person knowledgeable in the art of time domain wave propagation that the TDR elements could be replaced by time domain transmissometer (TDT) elements. In this alternative, the propagated signal is digitized at the distal end of the waveguide as a "reflection" from the distal end instead of being digitized at the incident end of the waveguide as with TDR elements. Because measurements are made in the time domain, the WOAT elements can provide VWC measurement accuracies of ±2% or better without soil specific calibration.

Each TDR element also incorporates a thermistor for measuring temperature in layers with ±0.3 C accuracy. The point at which the temperature is measured is at the top of each 10 cm layer. If two TDR elements are used for each layer, then 2 independent temperature measurements are available from each layer.

Each TDR element is equipped to take long-term waveform amplitude measurements and report layered, bulk electrical conductivity over the thickness of each layer, which is reported with an accuracy of ±2% up to 5000 µS/cm. Since accurate permittivity is also reported for each layer, it is possible to calculate the Pore Water Conductivity at each level in the WOAT stack—using the Hilhorst model. This calculation is best done external to the WOAT since knowledge of the specific soil permittivity offset in the denominator of the Hilhorst equation is required.

In some examples, three WOAT lengths are available: 0.5 meters, 1.0 meter and 2.0 meters. Each of these can be configured with 1 or 2 columns of TDR elements. Two independent TDR sensing stacks can be accommodated on one WOAT tube such that two readings can be collaborated at each layer of sensing. The top cap provides two flat cable connections on opposite sides of the WOAT to connect these two TDR strings.

The example WOATs are installed by first installing a thin-walled liner tube into an oversized hole. An auger with an expandable cutting tip is inserted inside the liner tube. As the auger is rotated clockwise, the cutting tip extends slightly beyond the outer radius of the liner tube thus facilitating an easy insertion of the liner tube. When the liner tube has been inserted to the desired depth the auger is rotated counterclockwise and the cutting tip withdraws so that the auger can be removed from the liner tube. The WOAT is inserted into the liner tube where it fits easily because of its smaller diameter. The liner tube prevents the sluffing off of soil into the installation hole. With the WOAT fully lowered into the liner tube, the liner tube is withdrawn, leaving the WOAT loosely positioned in the installation hole. The inner tube of the WOAT is then inflated with compressed air thus forcing the TDR elements to move outward and form a tight, sealing fit with the inner wall of the hole. The WOAT can also be easily removed by deflating the inner tube.

An alternate method of forming the oversized hole for the WOAT does not require an auger with extensible cutting flutes. It uses a standard auger to remove soil from inside the liner tube as the liner tube is forced downward. The liner tube incorporates a slight bell-shape at its lower end. This slight extension in the diameter of the liner tube enlarges the hole as the liner tube moves downward into the augured hole.

The WOAT assembly consists of an inflatable inner tube, a flexible fabric that wraps around the inflatable inner tube, several TDR elements bonded to the flexible fabric, several vertical interconnection strips that provide power and communications to the TDR elements and a top cap that interfaces to an SDI12 data recorder. The flexible fabric wrapping does not fully close to form a complete cylinder but incorporates a vertical slit that can widen as the inflatable inner tube expands. Each WOAT TDR element contains a small circuit board that supports the TDR chip and microcontroller. The TDR waveguide emanates from this circuit board and wraps circumferentially around and is bonded to the flexible supporting wrapping. Alternately the waveguide can be aligned vertically on the flexible supporting wrapping.

Figure 1A:
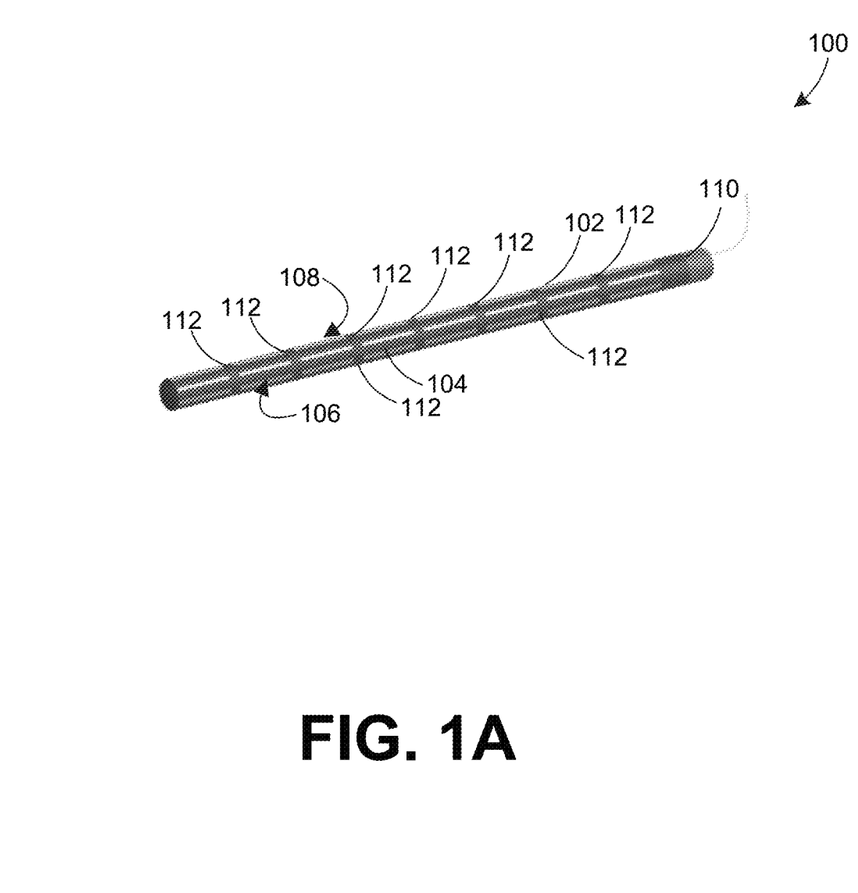
FIG. 1A is a perspective view of an example soil moisture sensor system according to this disclosure.

FIG. 1A shows an example WOAT system 100. The WOAT system 100 has a flexible wrapping 102 and an inflatable tube 104 positioned within the flexible wrapping 102. The flexible wrapping 102 has an interior wall 106 that is forced outward by the inflatable inner tube and an exterior wall 108 that presses against the soil. An end of the flexible wrapping 102 is connected to a top cap 110 that contains interface electronics. The inflatable inner tube is suspended from the top cap 110 and extends through the flexible wrapping 104. A vertical array of TDR elements 112 is bonded to the flexible fabric wrapping 104. Each of the TDR elements 112 in the vertical array includes a PCA supporting the TDR chip, microcontroller, and a TDR waveguide. Each of the TDR elements in the vertical array is connected to a power and communications bus that runs the full length of the assembly to the top cap 110. The TDR waveguides can be positioned either circumferentially around the WOAT or longitudinally on the surface of the flexible wrapping.

As the inflatable inner tube 104 is inflated, the flexible fabric with the TDR elements bonded to it is likewise expanded away from a center axis of the inflatable tube 104. The inflatable tube 104 can be inflated in any suitable manner, such as with compressed air or other injection of gas or fluid as needed. The uninflated WOAT is inserted inside the liner tub. The liner tube is then withdrawn from the hole. The inflatable tube is 104 is then inflated forcing the TDR elements tightly against the interior wall of the formed channel or hole.

Figure 1B:
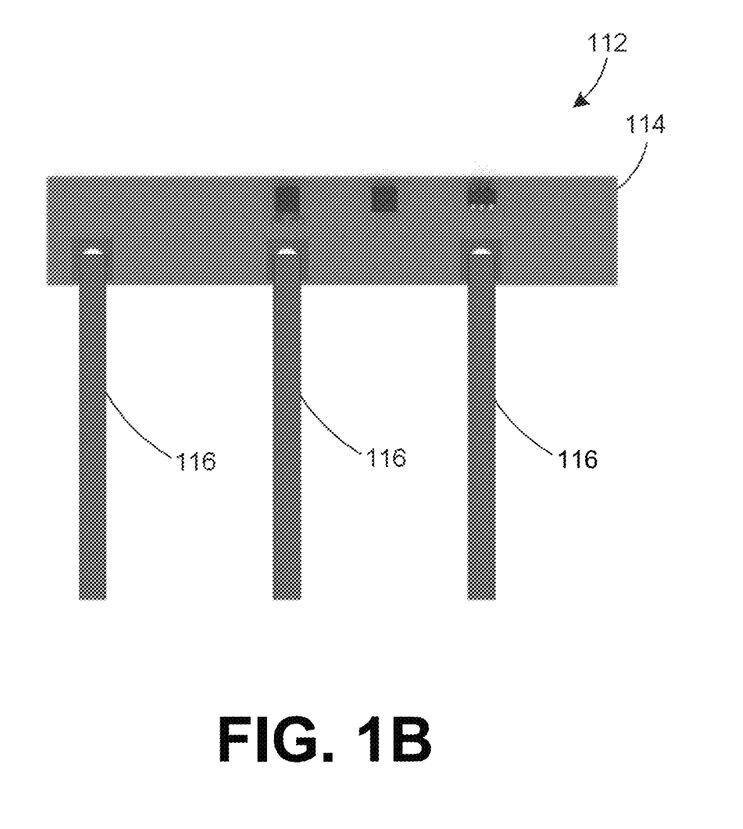
FIG. 1B is an example TDR element including a substrate and TDR waveguide.

FIG. 1B shows a substrate 114 and associated TDR waveguide elements 116 that comprise the TDR elements 112 shown in FIG. 1A. The substrate 114 is a small, printed circuit board (PCB) that supports the TDR chip and microprocessor. It also attaches to the interconnection bus for power and communications. In some alternative examples, the substrate can be a flexible material.

Figure 1C:
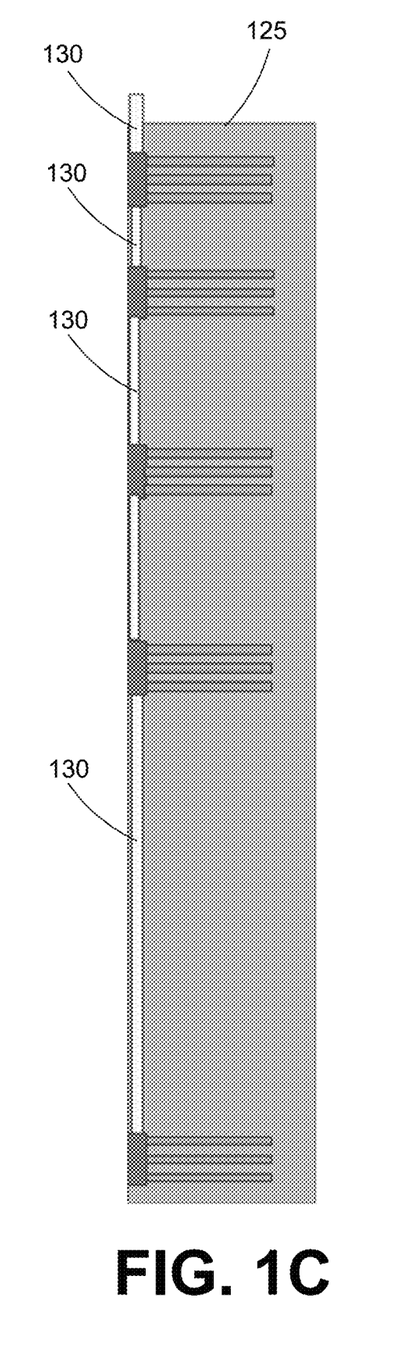
FIG. 1C is an example WOAT subsystem with TDR elements bonded to a flexible substrate.

FIG. 1C shows an example of a WOAT subsystem with 5 horizontal TDR elements 112 bonded to a flexible substrate 125. The communications and power bus 130 is shown interconnecting the TDR elements 112.

Figure 1D:
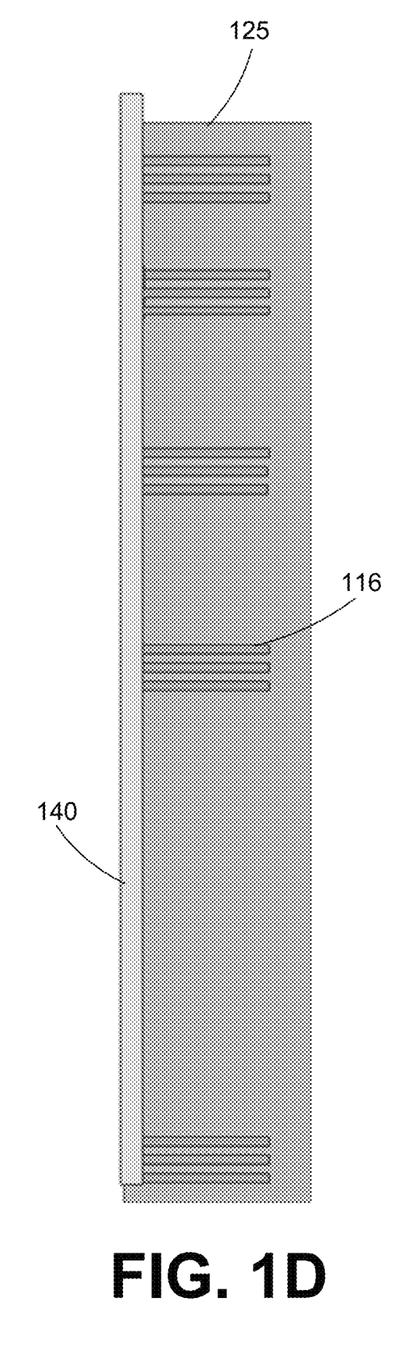
FIG. 1D is the example WOAT subsystem from FIG. 1C with a waterproof strip covering the electronics.

FIG. J D shows the example WOAT subsystem from FIG. 1C with a waterproof strip 140 covering the circuit boards and interconnection bus strips. The TDR waveguides 116 protrude from under the protective strip 140 where they are in contact with the soil when the WOAT is installed.

In some examples, the flexible wrapping is made of a material similar to that used in life rafts and each of the TDR elements in the vertical array that are bonded to the wrapping form a semi-circular shape that wraps around a hemisphere of an inflatable tube 104. In this example, a second array of TDR elements can wrap around the opposing hemisphere of the inflatable tube 104. The second array of TDR elements can be positioned to be aligned with the TDR elements on the first side of the WOAT thus enabling replicated measurements at each level in the array.

Each vertical stack of TDR elements can have up to 20 TDR sensors in some examples. The number of TDR sensors can be less or more than 20 in alternative examples. Each TDR element in the vertical stack is spaced equally apart or can be spaced apart a specific distance to target a measurement at the specified depth. In some examples, each of the TDR waveguide sensors operates independently of the TDR waveguide sensors on other TDR elements in the vertical stack. In other examples, a portion of the TDR waveguide sensors coordinate their measurements or validate each other's measurement.

In some embodiments, each TDR waveguide includes multiple vertical metallic strips, such as 3 strips. The strips can be made of stainless steel foil to be flexible. Each of the TDR waveguide elements can be wired to the TDR elements of a neighboring layer. This can be configured as a daisy-chain style of wiring through the array of vertically stacked TDR elements and can provide power and data communication between the TDR elements. In the daisy-chain style of wiring the TDR elements, they can each be electronically coupled to the top cap 110 of the WOAT system. The top cap 110 can house communications and a control microprocessor and can be positioned at one end of the daisy-chain of the vertical stack(s) of TDR elements.

In some example WOATs, communications from the top cap to the TDR elements is standard asynchronous UART protocol using 3.3 volt non-inverted half-duplex signaling at 57,600 baud, 9 data bits, even parity and 1 stop bit. The WOAT top cap addresses up to 40 TDR elements—up to 20 elements on each side of the WOAT tube. Two UARTs are used to reduce the loading on each of the 2 busses—one for each of the two TDR stacks on each side of the tube. Communications between the Top Cap and the TDR elements are divided into two separate address sets. The first set (addresses 01 through 20) communicates with up to 20 TDR elements on the first side of the WOAT Tube and the second set (addresses 01 through 20) communicates with up to 20 elements on the second side of the tube. Address '01' is used for the top 10 cm layer. Address '20' is used for the bottom layer at 2 meters deep. Two USART connectors are provided on the top cap for double-sided WOAT connections. The default address that is used for testing the WOAT element is '0'. The TDR elements enter finished goods inventory with the '0' address. Unique addresses are hard coded into each TDR element through the SWDIO port at the time the element is attached to the WOAT tube. In some examples, a sticker designating the element address is placed on the front of the element at that time. The addresses cannot be changed through the serial ports but must be brought to the assembly fixture if an address modification is needed.

During the WOAT assembly process at the factory, the top cap is programmed with a list of the populated TDR element addresses. This is used by the top cap in obtaining readings by restricting its read commands only to populated devices.

Two lists are kept in registers in non-volatile memory in the top cap. The first is for the front side of the WOAT and the second is for the back side. Each list contains a '1' or a '0' depending on whether that depth location is populated or not. These 'population' registers are set in the factory during the WOAT assembly. They are accessed by first unlocking the n-v memory using the aXU! command and then executing the aXPOPFxx! or aXDELFxx! commands for the front side of the WOAT and aXPOPBxx! or aXDELBxx! commands for the back side of the WOAT. xx is the address (01 through 20) of the populated or deleted element in the front or back WOAT stack. Finally, the n-v memory is re-locked using the aXL! Command. A list of populated elements can be read by the data recorder using the aXRPOP! Command.

The data returned from the TDR element to the top cap consists of an idle frame, an address/command frame, 2 volumetric water content frames, 2 temperature frames, 2 permittivity frames and 2 bulk electrical conductivity frames. When a waveform is requested, the returned data consists of an idle frame, an address/command frame, 2 initial point amplitude frames, 4093 amplitude frames and 2 CRC frames. The method of transmitting the waveform points is a sigma-delta approach where the first point is transmitted as an absolute value and all following points are transmitted as positive or negative increments to that first point. This reduces the data load to 50% of what it would be if all points were transmitted in absolute values.

When the addressed TDR element receives a measurement command, it immediately takes measurements and returns readings. The first returned frame is a 12-bit idle frame followed by the 12-bit TDR element address frame. Following that are 2 frames each with VWC in tenths of percent, temperature in tenths of degree Celsius, permittivity in tenths of units and BEC in µS/cm. The total returned packet size from each element is 96 bits. The return data transmission time is then 1.667 ms. The command transmission time from the top cap to the TDR element is 0.417 ms. The time required by the TDR to take the readings is expected to be about 150 ms. Thus, the total time to read 40 TDR elements is about 6.0 seconds. The round-trip communications time is 2.08 ms or 83.3 ms for a 40 element WOAT. This brings the total 40 element communication and read processing time to 6.083 seconds for a fully populated WOAT—152 ms per element.

In some examples, the WOAT top cap provides the interface between an SDI12 Data Recorder and multiple WOAT TDR elements. The Data Recorder can be any SDI12 unit that is capable of providing 6v to 16v power to the WOAT at ≥300 mA and communicating with the WOAT system using the standard SDI12 version 1.4 protocol. The SDI12 version 1.4 protocol is used for communications between the top cap and the data recorder and uses inverted RS232 logic and runs at 1200 baud, 7 data bits, even parity and 1 stop bit. The WOAT top cap decodes standard SDI12 commands from the data recorder and initiates the indicated action among the TDR elements it controls.

High volume bulk commands are used in the top cap to data recorder communications. The WOAT system is designed such that readings from all elements are taken when a single aHB! command is issued from the data recorder. Only one SDI12 address is used for the whole WOAT system. When an aHB! command is sent from the data recorder to the top cap, the top cap uC returns a 10 second wait request and a data item count of 6×n where n is the number of populated TDR elements in the WOAT. The top cap refers to its stored TDR element population registers and issues read commands to and receives data from each populated TDR position in sequence. As the readings are acquired, they are buffered in the top cap. The readings are transmitted to the data recorder in response to aBDO! Command. The format for each frame is 1 start bit, 8 data bits, no parity and 1 stop bit. The format for the returned string is:

| | |
|---|---|
| SDI12 Address | 1 byte |
| Packet Size (bytes) | 2 bytes 9 to 360 (9 for each TDR element) |
| Data Type | 1 byte 2 (unsigned int - 8-bits) |
| Data Payload (see below) | 9 to 360 bytes depending on WOAT TDR population |
| TDR Address | 1 byte |
| VWC | 2 bytes |
| Temperature | 2 bytes |
| BEC | 2 bytes |
| Vin | 1 byte |
| Iin | 1 byte |
| CRC | 2 bytes |

The minimum string length is 15 frames–6 overhead and 9 data. The maximum string length is 366 frames–6 overhead plus 9*40=360 frames of data. The frames are 10 bits in length. The time required to transmit data from one element is then 125 ms. The time required for transmitting 40 elements worth of data at 1200 baud is 2.44 seconds. The total time at the data recorder to invoke, measure and communicate a full WOAT reading with 40 populated elements is 8.523 seconds.

The water content and permittivity readings reported by the TDR elements are obtained through a proprietary analysis of a time domain waveform recorded by the TDR element. It is often of importance to review the waveform to obtain other soil parameters, such as soil type. Raw waveforms can be obtained from individual TDR elements using the extended SDI12 command aXWsxx! where sxx is the front/back/depth address of the TDR element. Waveform acquisitions are not supported for data recorders that cannot implement this extended command. When the top cap receives a valid aXWsxx! Command, it follows up by sending an idle frame and address frame with the W/D bit set to '1' to all TDR elements on the side of the WOAT indicated by 's'. The TDR element with the sxx address responds with the waveform, and then sends a service request back to the recorder. The recorder picks up the waveform from the Top Cap using the high density bulk command aBDO!.

The standard low volume SDI12 commands do not have the addressing provisions to request data from a single TDR element. These low volume SDI12 commands can be used by the data recorder provided it can support the extended command, aXAsxx!, that sets the side and depth of the sensor to be addressed. The procedure is to first acquire a mass reading from all elements using the aHB! command. Then, the aXAsxx! command is used to set the side and depth where a reading is desired. The various low volume SDI12 commands such as aM!, aC!, aV!, etc. can then be used to extract the data segment from the top cap that pertains to that side and address. In all cases the 'a' address is that of the overall WOAT system.

The WOAT elements take two kinds of readings: the standard set is VWC, Temp, Permittivity and BEC. The other data it acquires is a waveform. The distinction between the waveform reading and the data reading is made by testing the W/D (waveform enable) bit in the top cap. This bit is set/cleared using the aXWx! Command where x=1 if a waveform is desired and x=0 (the default state) if sensor readings are required.

Figure 2A:
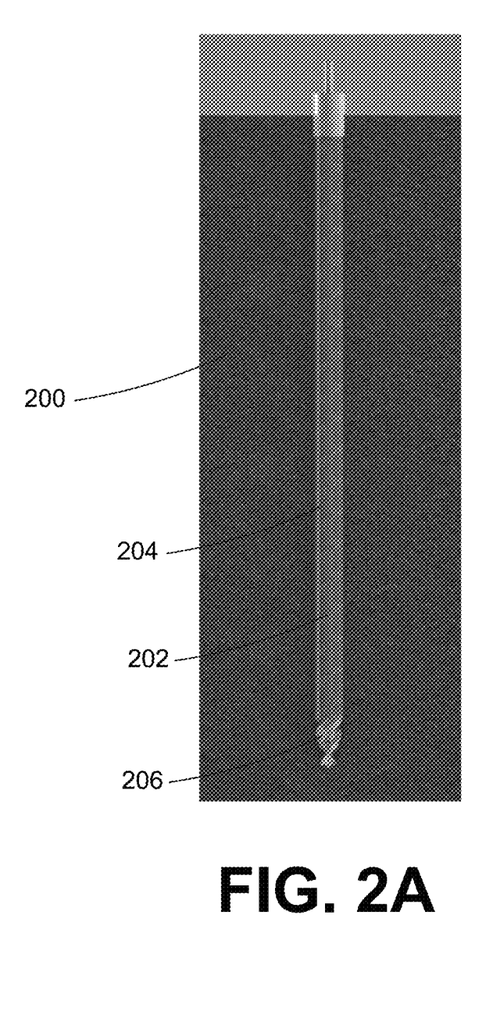
FIGS. 2A & 2B are examples of a soil moisture sensor system shown in FIG. 1 installed in soil media.

Turning now to FIG. 2A, an auger 202 to install a WOAT system into a medium is disclosed. In this example, the medium is soil. The auger 202 can be made of different sizes, materials, hardness, or any other characteristics depending on the type of medium into which it will be creating a channel or hole for the WOAT system. In FIG. 2A, the auger 202 is shown inserted into the rigid tube 204 through its entire length to extend beyond the end of the rigid tube 204 into the medium. When the auger 202 is powered, it rotates in a spiral motion along its length to contact the medium beyond the end of the rigid tube 204 to create the hole or channel in the medium. In this example, the auger 202 has a diameter to create a hole or channel approximately the same diameter as the rigid tube 204, which is a smaller diameter than the inflatable tube in its deflated condition. After the auger 202 creates the hole or channel, the auger 202 is removed from the hole or channel to allow for the deflated inflatable tube and its attached wrapping and TDR elements to be inserted. Once inserted, the deflated inflatable tube is inflated to cause the TDR sensors to be force fit against the interior wall of the hole or channel.

In other examples, the auger 202 has a tip 206 that expands beyond the diameter of the rigid tube 204 to create a hole or channel with a diameter that is larger than the diameter of the rigid tube 204. To allow for the tip 206 of the auger 202 to have a diameter than is larger than the rigid tube, the tip 206 must be extendible to a diameter that fits within the rigid tube, then extended or flare out to its larger diameter after the tip extends beyond the end of the rigid tube.

Figure 2B:
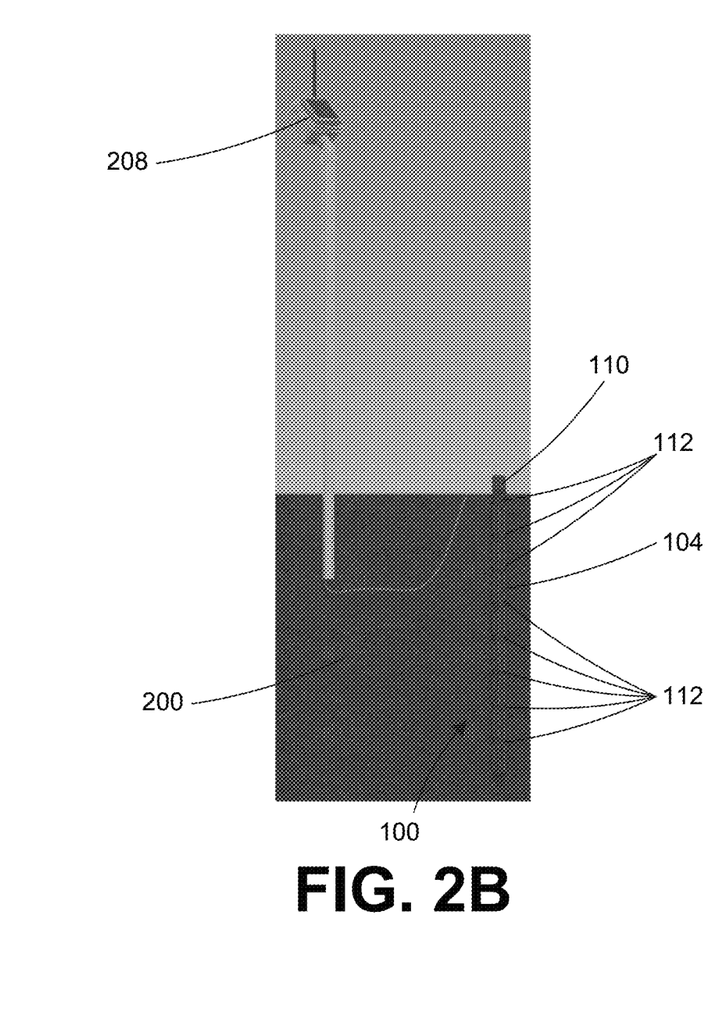

FIG. 2B shows a WOAT system 100 positioned in the medium 200 with the inflatable tube 104 inflated. The vertical stack of TDR elements 112 is bonded to the inflatable tube 104 to be pressed against the interior wall of the hole or channel created by the auger tip 206. Once the auger tip 206 creates the hole or channel, the auger 202 is removed from the hole or channel. The deflated inflatable tube 104 with the bonded vertical TDR elements 112 is inserted into rigid tube 204, which prevents soil from sluffing into the hole during installation. With the WOAT assembly inside the rigid tube 204, the rigid tube 204 is withdrawn from the hole. Then, the inflatable tube 104 is inflated to press fit the inflatable tube 104 and the bonded vertical TDR elements 112 against the interior wall of the hole or channel.

As discussed above, the top cap 110 of the inflatable tube 104 is electronically coupled to each of the vertical plates—and their respective TDR sensors 116—regardless of whether the TDR sensors 116 are attached or bonded to a flexible substrate, vertical strips, or wired. The top cap 110 can be electronically coupled to a reader, transmitter, or other computing device, such as the reader 208 shown in FIG. 2B. The electronic coupling can be wired, as shown in FIG. 2B, or can be wireless in alternative embodiments. The reader 208 can include a communications module in some examples or the top cap 110 can include the communications module. If the reader 208 includes the communications module, it can communicate to a central server or other computing device. In the examples with multiple WOAT systems 100, each can be electronically coupled to the central server or other computing device either through the communications module in the respective top caps 110 or through the reader 208, as appropriate.

Figures 3A, 3B:
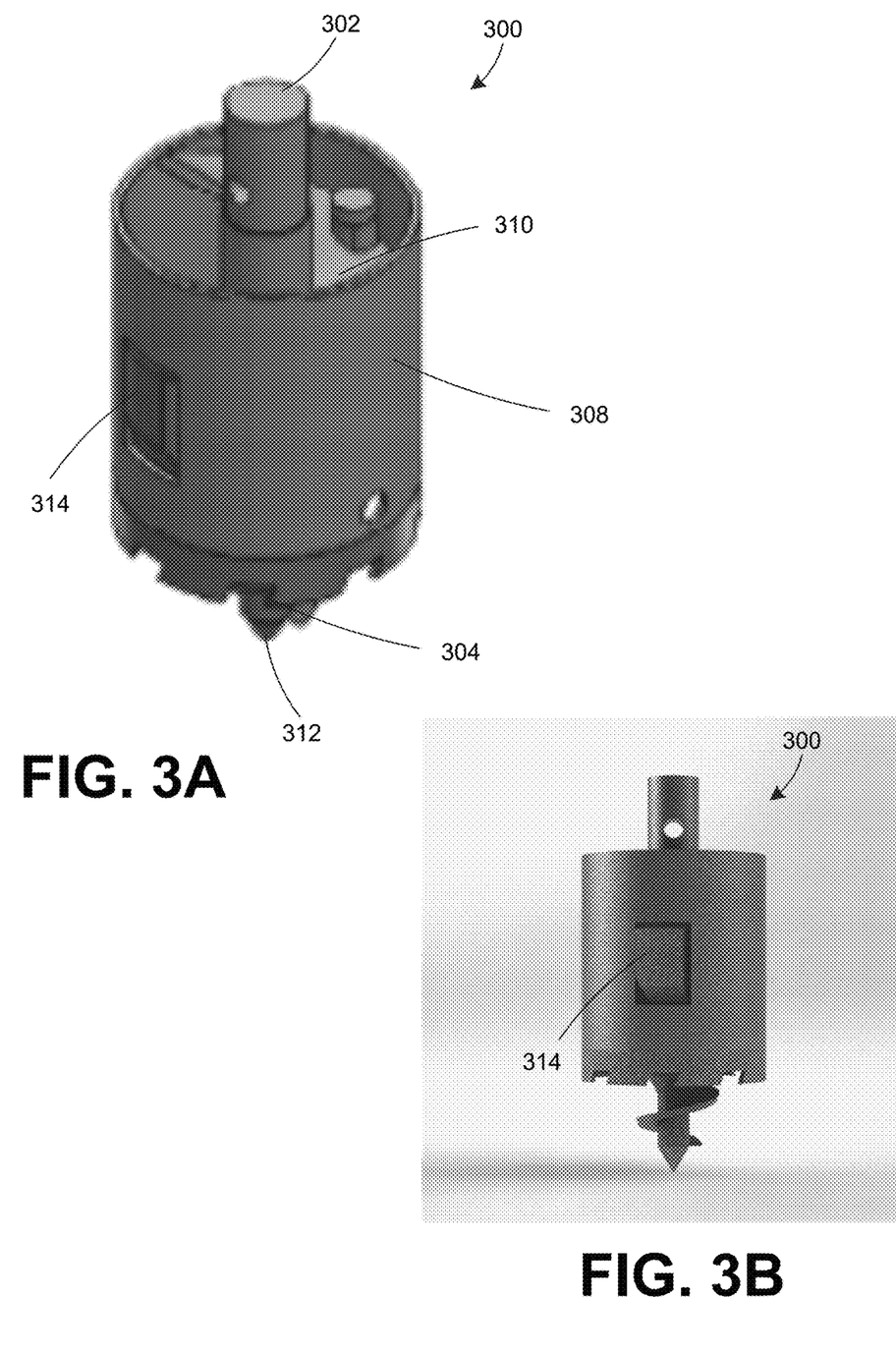
FIGS. 3A & 3B are example auger heads used to install the example WOAT systems with a cutting flute in a retracted and an extended position, respectively.
Figure 4:
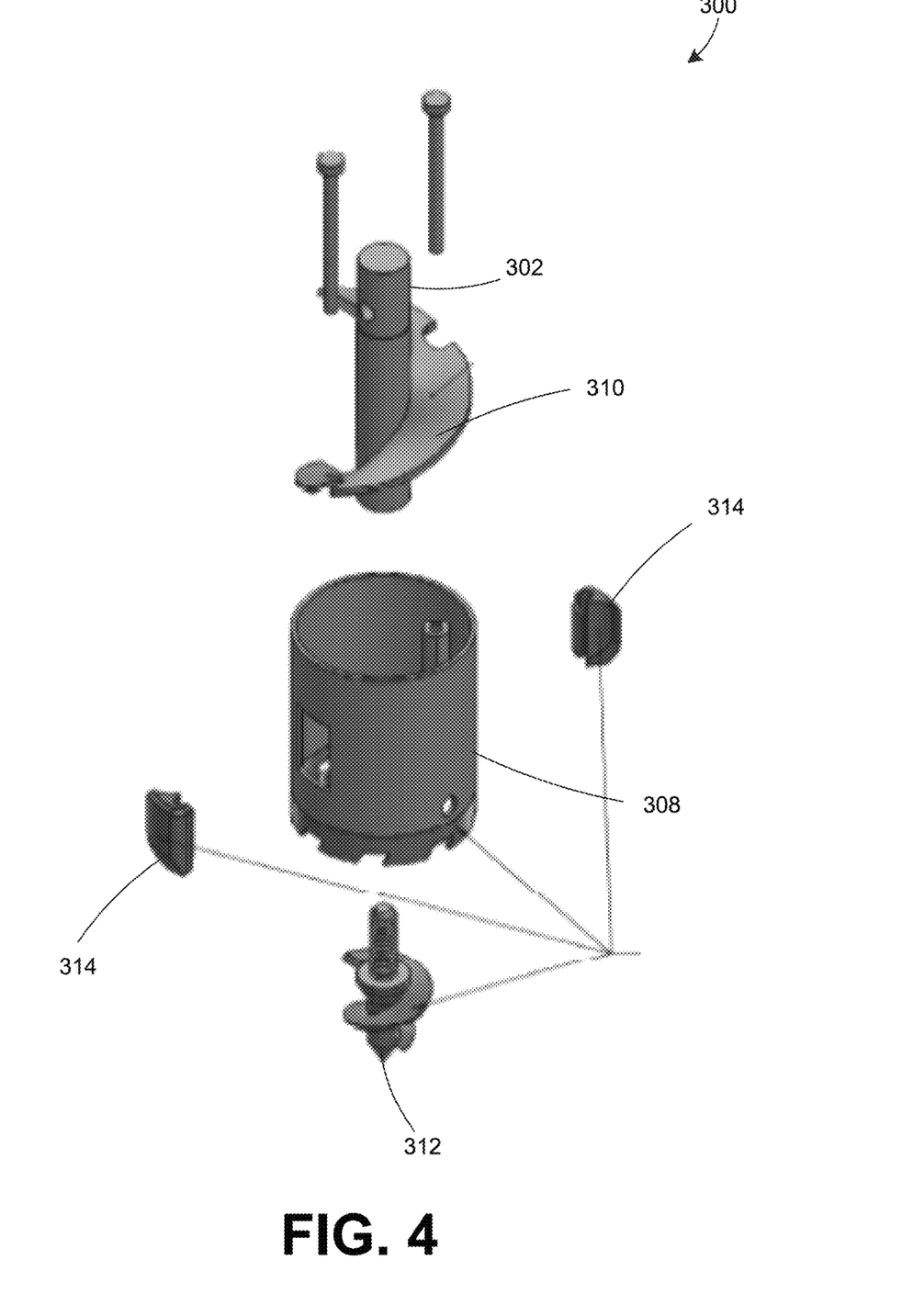
FIG. 4 is an exploded view of the example auger head shown in FIG. 3A.

FIGS. 3-5B show various perspectives of an example extendible auger tip 300 according to aspects of the disclosure. Alternative auger tips can be non-extendible, standard auger tips that do not include components that extend beyond the diameter of the rigid tube through which it is inserted. FIGS. 3 and 4 show the extendible auger tip 300 having a proximal end 302 and a distal end 304. The extendible auger tip 300 includes a central post 306 that extends along its length through a housing 308. The post 306 rotates radially within the housing 308 and has a spiral blade 310 that wraps around the post 306 from the proximal end 302 to the distal end 304. When the spiral blade 310 rotates, a pointed tip 312 of the distal end 304 extends further into the medium into which it is creating a hole or channel.

The extendible auger tip 300 includes an extendable cutting flute 314 that extends after the auger is inserted through the rigid tube to expose the auger tip 300 beyond the end of the rigid tube. The cutting flute 314 remains in a retracted position for storage while the auger is inserted through the rigid tube. FIG. 3 shows the extendable cutting flute 314 in its retracted position. FIG. 4 shows the extendable cutting flute 314 in its extended position. The retracted position of the cutting flute 314 causes the cutting flute 314 to be flush with or positioned within the housing 308 of the extendable auger tip 300. The extended position of extendable cutting flute 314 extends the cutting flute beyond the diameter of the housing 308 of the auger tip 300. In the extended position, the cutting flute 314 creates a hole or channel with a diameter larger than the diameter of the housing of the auger tip 300. That also means that the extendable cutting flute 314 creates a hole or channel with a diameter larger than the diameter of the rigid tube since the auger is inserted through the rigid tube to create the hole or channel.

In some examples, such as those shown in FIG. 4, the auger tip 300 has more than one extendable cutting flutes 314. FIG. 4 shows an auger tip 300 in an exploded view with two cutting flutes on opposite sides of the housing 308. In other examples, the cutting flutes can be positioned in any suitable configuration and the auger tip 300 can include any suitable number of cutting flutes.

The cutting flutes 314 shown in FIGS. 3 and 4 can be extended and retracted one or multiple times to create the hole or channel for the rigid tube. The cutting flutes 314 can be extended and retracted by mechanical or electromechanical rotation, an actuator, button, or other manual or automatic means. If automatic, the auger tip 300 could include a sensor, such as an accelerometer, depth, optical, or other sensor that can measure a metric that then triggers the cutting flute to be expanded. In some examples, the cutting flute(s) are integrated into the auger while in other examples the cutting flute(s) are a separate but complimentary component to the auger 300.

Figure 5A:
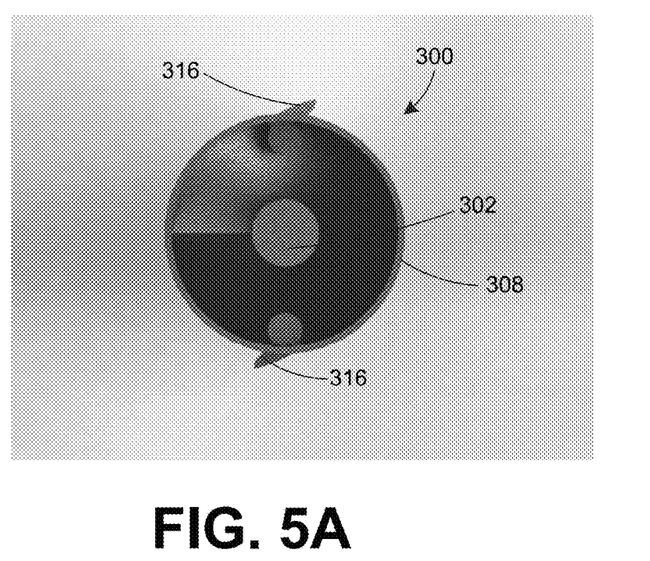
FIGS. 5A & 5B are top and bottom plan views respectively of another example auger head with extendable cutting flutes.
Figure 5B:
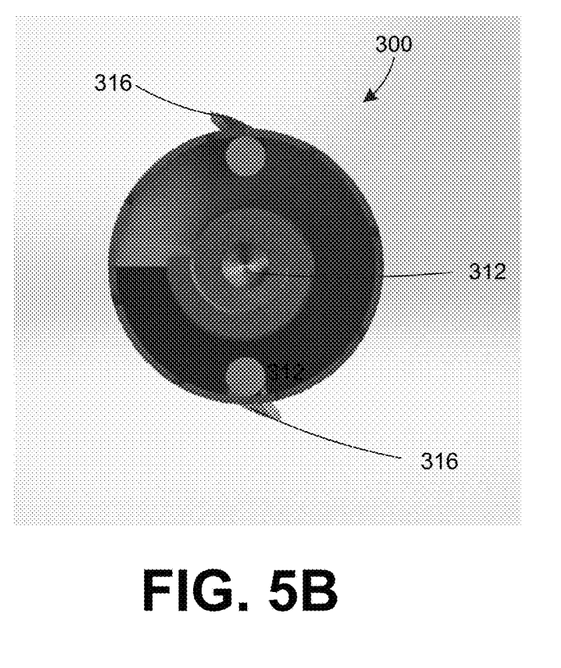

FIGS. 5A and 5B show top plan and bottom plan views of example extendable auger tips 300 with extendable cutting flutes 316 that are shaped as a blade to help disrupt or cut the medium into which the auger is creating a hole or channel. These blade style cutting flutes 316 actuate to expand after the auger tip 300 is extended through the rigid tube to be exposed on the distal end.

Figure 6:
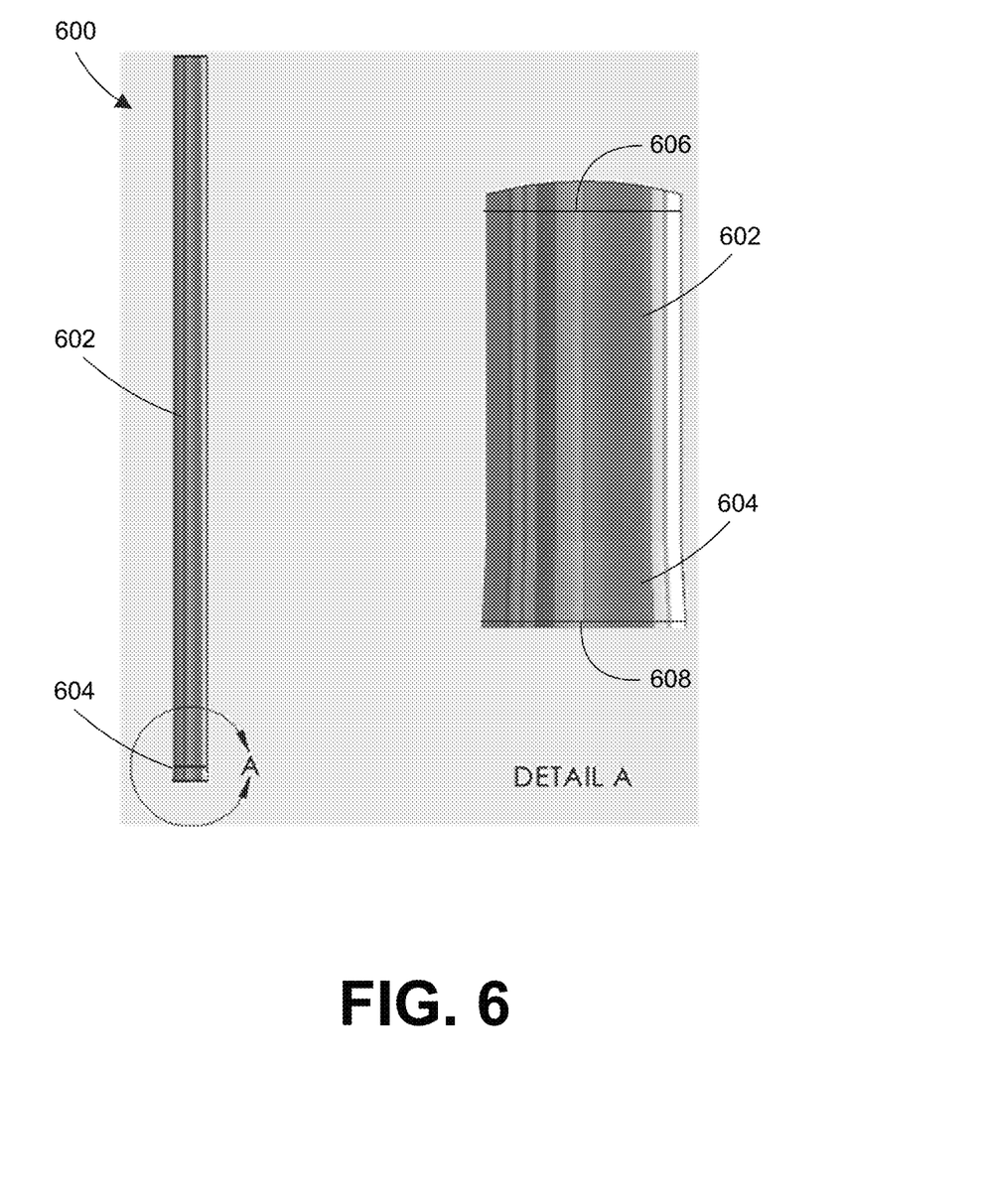
FIG. 6 is an example liner tube with a bell-shaped lower cutting edge.

FIG. 6 shows tool 600 for an alternate method of forming an oversized hole without using a special auger with extended cutting flutes. This technique uses a liner tube 600 having a body 602 with a bell-shaped bottom 604. The bell diameter is slightly larger than the remaining diameter of the tube body 602. During the auguring process, the liner tube 600 is forced downward behind a standard auger. This action enlarges the hole so that the liner tube body 602 fits loosely in the hole so that it can be easily withdrawn. Once the hole is completed, the auger is removed and the un-inflated WOAT is inserted into the liner tube. The liner tube is then withdrawn from the hole and the inner tube in the WOAT is inflated to create a tight fit between the WOAT and the inner wall of the hole.

Figure 7:
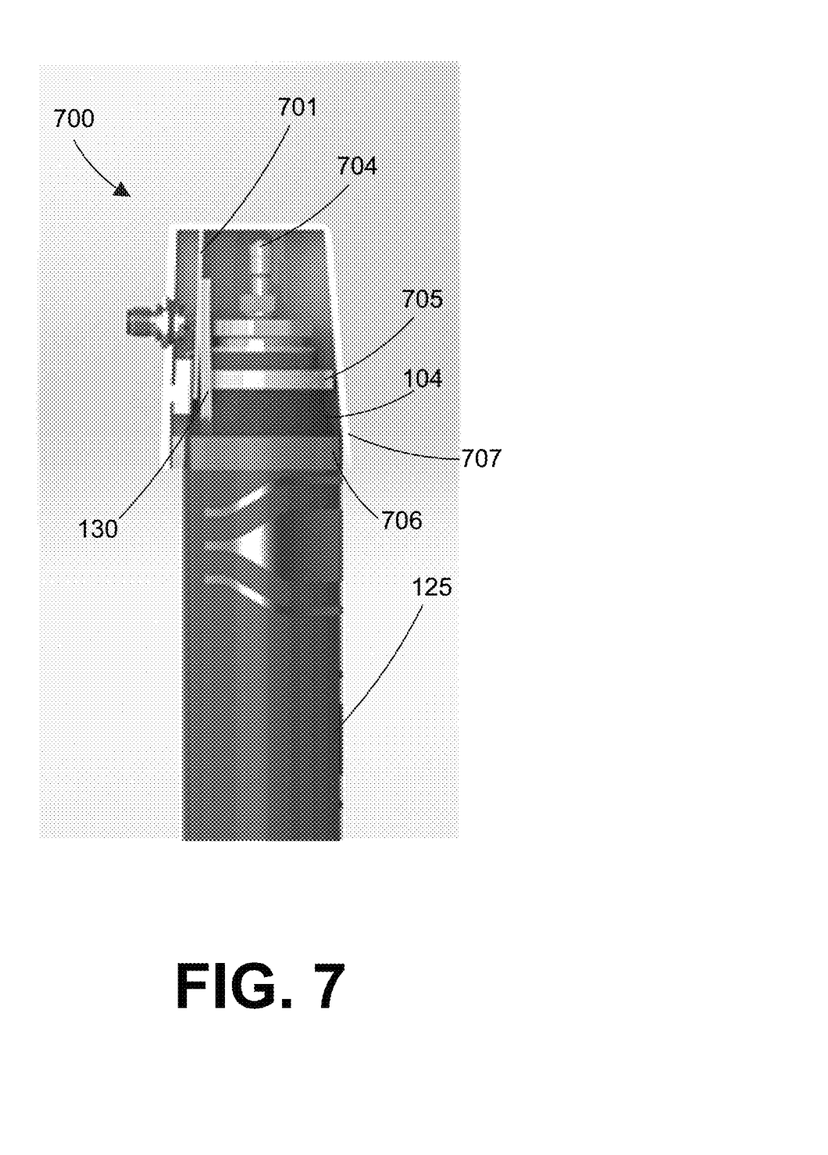
FIG. 7 is an example of an upper portion of a WOAT system.

FIG. 7 shows an example of the upper portion of a WOAT instrument 700. A printed circuit board 701 supports the interface circuitry between the TDR elements 112 and the data recorder. The interconnection bus 130 is electrically connected to the PCB 701. A Schrader valve 704 is used as the injection port for inflating the inflatable inner tube 104. The inner tube 104 is sealed to the Schrader valve assembly using a clamp ring 705. A flexible substrate 125 wraps around the inner tube 104 and is retained using a spring clamp 706. A top cap 707 protects the circuit board 701 and electrical connections from the elements.

The systems and methods disclosed herein may be embodied in many different forms and should not be construed as limited to the embodiments set forth herein; rather, these embodiments are provided so that this disclosure will satisfy the statutory requirements and convey the scope of the subject matter to those skilled in the art.

What is claimed is:

1. A waveguide on access tube (WOAT) system, comprising:
    a rigid tube having an interior wall and an exterior wall;
    an inflatable tube;
    a cap containing interface electronics and from which the inflatable tube is suspended;
    a vertical array of TDR elements bonded to the inflatable tube, each of the vertical array of TDR elements having a respective time domain reflectometer (TDR) waveguide;
    wherein when the inflatable tube is in an uninflated position, the vertical array of TDR elements is fitted within and spaced apart from the interior wall of the rigid tube.

2. The system of claim 1, wherein the TDR elements are time domain transmissometer (TDT) elements.

3. The system of claim 1, wherein, when the inflatable tube is in an inflated position, the inflatable tube has a diameter that exceeds the diameter of the rigid tube.

4. The system of claim 1, wherein the inflatable tube is configured to be inflated to an inflated position that causes the diameter of the inflatable tube and the vertical array of TDR elements bonded to the inflatable tube to have a diameter in the inflated position that exceeds the outer diameter of the rigid tube.

5. The system of claim 4, wherein the inflatable tube is only inflated after the rigid tube is removed from a hole into which the rigid tube and the uninflated inflatable tube with the bonded TDR elements are received.

6. The system of claim 1, wherein the TDR elements in the vertical array are semi-circular.

7. The system of claim 1, wherein the vertical array of TDR elements is a first vertical array of TDR elements, and wherein a second array of vertically stacked TDR elements is positioned opposite the first array of TDR elements.

8. The system of claim 7, wherein the second vertical array of TDR elements has the same number of TDR elements as the first vertical array of TDR elements.

9. The system of claim 7, wherein the second vertical array of TDR elements is configured to sense a measurement on an opposite side of the inflatable tube as the first vertical array of TDR elements.

10. The system of claim 1, wherein the second vertical array of TDR elements is positioned to mirror spacing between the first vertical array of TDR elements so that each TDR element in each of the first vertical array of TDR elements and the second vertical array of TDR elements, respectively, has a mate at approximately the same position along the inflatable tube.

11. The system of claim 1, wherein the second vertical array of TDR elements is also bonded to the inflatable tube.

12. The system of claim 1, wherein the vertical array of TDR elements has up to 20 TDR elements.

13. The system of claim 1, wherein each TDR element in the vertical array is spaced equally apart from a neighboring TDR element.

14. The system of claim 1, wherein the inflatable tube includes multiple vertical electrically conductive strips to which the vertical array of TDR elements is attached.

15. The system of claim 14, wherein the inflatable tube includes 3 vertical electrically conductive strips.

16. The system of claim 14, wherein the vertical electrically conductive strips are stainless steel.

17. The system of claim 1, wherein each TDR element in the vertical array is wired to a neighboring TDR element in the vertical array in a daisy-chain style through the length of the array of vertically stacked TDR elements.

18. The system of claim 17, wherein each of the TDR elements are electronically coupled to a top cap of the WOAT system.

19. The system of claim 17, wherein each TDR element operates independently of the TDR elements in the vertical array.

20. The system of claim 17, further comprising a communications and control microprocessor that is housed in a top cap above the inflatable tube, and wherein the daisy chain connected TDR elements are wired to the communications and control microprocessor in the top cap.

* * * * *